(12) United States Patent
Matthews et al.

(10) Patent No.: US 10,955,325 B2
(45) Date of Patent: Mar. 23, 2021

(54) ACTUATABLE PADDLE AND METHODS OF USE

(71) Applicant: Halliburton Energy Services, Inc., Houston, TX (US)

(72) Inventors: Kenneth Heidt Matthews, Kingwood, TX (US); Ben John Iverson, Spring, TX (US); Andrew David Vos, Spring, TX (US); Christopher Ray Bell, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 463 days.

(21) Appl. No.: 15/313,325

(22) PCT Filed: Aug. 27, 2014

(86) PCT No.: PCT/US2014/052860
§ 371 (c)(1),
(2) Date: Nov. 22, 2016

(87) PCT Pub. No.: WO2016/032454
PCT Pub. Date: Mar. 3, 2016

(65) Prior Publication Data
US 2017/0212026 A1    Jul. 27, 2017

(51) Int. Cl.
*G01N 11/14*      (2006.01)
*E21B 41/00*      (2006.01)
(Continued)

(52) U.S. Cl.
CPC .............. *G01N 11/14* (2013.01); *E21B 41/00* (2013.01); *F16H 1/222* (2013.01); *F16H 57/0025* (2013.01); *E21B 33/14* (2013.01)

(58) Field of Classification Search
None
See application file for complete search history.

(56) References Cited

U.S. PATENT DOCUMENTS

| | | | | |
|---|---|---|---|---|
| 2,905,451 A | * | 9/1959 | Thomas | B01F 7/30 |
| | | | | 366/244 |
| 4,466,276 A | * | 8/1984 | Ruyak | G01N 11/14 |
| | | | | 73/54.35 |

(Continued)

FOREIGN PATENT DOCUMENTS

| GB | 2127558 A | 4/1984 |
|---|---|---|
| JP | 2010032565 A | 2/2010 |
| WO | 2016032454 A1 | 3/2016 |

OTHER PUBLICATIONS

Fan N, Model 290 HPHT Consistometer Instruction Manual, 100071979 Slurry Cup Assy—Automated HPHT Consistometer, 2012.

(Continued)

*Primary Examiner* — Jill E Culler
(74) *Attorney, Agent, or Firm* — Gilliam IP PLLC (57) ABSTRACT

An exemplary paddle includes a central shaft having a first end and a second end. One or more lateral blades extend laterally from the central shaft, and each lateral blade including a geared end positioned adjacent the central shaft and a distal end opposite the geared end. Each lateral blade provides a blade gear at the geared end. A drive shaft is movably positioned within the central shaft and operatively coupled to the one or more lateral blades such that rotation of the drive shaft about a central axis rotates the one or more lateral blades about a corresponding one or more blade axes. The one or more lateral blades are able to move between a horizontal position and a vertical position via independent actuation.

21 Claims, 5 Drawing Sheets

(51) Int. Cl.
*F16H 1/22* (2006.01)
*F16H 57/00* (2012.01)
*E21B 33/14* (2006.01)

(56) References Cited

U.S. PATENT DOCUMENTS

| | | | |
|---|---|---|---|
| 4,534,209 A | | 8/1985 | Sanders |
| 4,653,313 A | * | 3/1987 | Sabins .................. G01N 11/14 73/54.28 |
| 4,885,917 A | * | 12/1989 | Spector .................. A23G 9/045 366/205 |
| 5,842,785 A | * | 12/1998 | Brown ................ A61B 17/8825 366/139 |
| 6,283,625 B2 | | 9/2001 | Frankel et al. |
| 6,971,262 B1 | * | 12/2005 | Marchal ................ B01F 7/1675 73/514.15 |
| 2003/0070216 A1 | | 4/2003 | Bertoni |
| 2006/0083589 A1 | | 4/2006 | McClain |
| 2007/0214590 A1 | | 9/2007 | Boe |

OTHER PUBLICATIONS

International Search Report and Written Opinion for PCT/US2014/052860 dated May 19, 2015.
NO Application U.S. Appl. No. 20162023, Second Office Action; dated May 29, 2020, 4 pages.
UK Application Serial No. 1621442.1, Examination Report, dated May 27, 2020, 2 pages.
United Kingdom Application Serial No. 1621442.1; First Exam Under Section 18(3); dated Feb. 5, 2020, 3 pages.

\* cited by examiner

ACTUATABLE PADDLE AND METHODS OF USE

BACKGROUND

The present disclosure is related to fluid testing apparatus and, more particularly, to actuatable paddles for consistometers and their methods of use.

Hydraulic cement compositions are frequently used in subterranean well completion and remedial operations. In cementing operations carried out in oil, gas and other wells, a hydraulic cement composition and various additives are mixed with sufficient water to form a pumpable cement slurry, and the cement slurry is pumped into a subterranean zone to be cemented. For instance, in primary cementing operations cement slurries are used to cement strings of pipes such as casings and liners in wellbores. To accomplish this, a cement slurry is pumped into the annular space between the walls of a wellbore and the exterior surfaces of a pipe string disposed therein. The cement slurry is then permitted to set in the annular space and, once hardened, it forms an annular sheath of substantially impermeable cement, which supports and positions the pipe string in the wellbore and bonds the exterior surfaces of the pipe string to the walls of the wellbore.

Since cement slurries are required to perform in high temperature and high pressure environments commonly found downhole, cement slurry compositions are often tested under simulated downhole conditions prior to pumping a batch of the cement slurry for downhole operation. The cement slurry composition is subjected to various tests under downhole conditions to determine its rheology, thickening time, and transition time, among other tests. Such tests are often undertaken by using high temperature, high pressure consistometers, which include a canister or "slurry cup" to hold the cement slurry composition and a paddle disposed in the slurry cup to stir the cement slurry under test conditions. In order to test for each of rheology, thickening time, and transition time, it is often necessary to test separate volumes of the cement slurry composition at multiple consistometer test stations since the geometry and makeup of one canister and paddle combination may not be amenable for testing each parameter of the cement slurry composition.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to fluid testing apparatus and, more particularly, to actuatable paddles for consistometers and their methods of use.

The embodiments described herein provide various configurations of paddles used in consistometers to stir a fluid composition for testing purposes. The paddles disclosed herein may include a central shaft, a drive shaft movably positioned within the central shaft, and one or more lateral blades that may be rotated by rotating the drive shaft using an external driver. In some cases, the drive shaft may include multiple drive shafts that are concentrically arranged within one another and thereby able to actuate multiple sets of lateral blades. Rotating the lateral blades results in changing their angular orientation between a horizontal position, where the lateral blades cause minimum drag on the paddle as moving through a fluid composition, and a vertical position, where the lateral blades cause maximum drag on the paddle as moving through the fluid composition. Advantageously, the lateral blades may be independently manipulated and, therefore, a single paddle geometry may be adjusted for various purposes ranging from fluid mixing and homogenization to measuring thickening time, rheology, and settling of the fluid composition under downhole conditions using the same piece of equipment. As a result, laboratory space can be reduced as a single piece of equipment can theoretically be adjusted for multiple testing purposes. Furthermore, if done properly a fluid composition could be conditioned and then tested for rheology, thickening time and transition time without having to remove preselected temperature and pressure parameters from the system. As will be appreciated, this reduces error in the test and allows for a smooth transition from one testing method to another.

Figure 1:
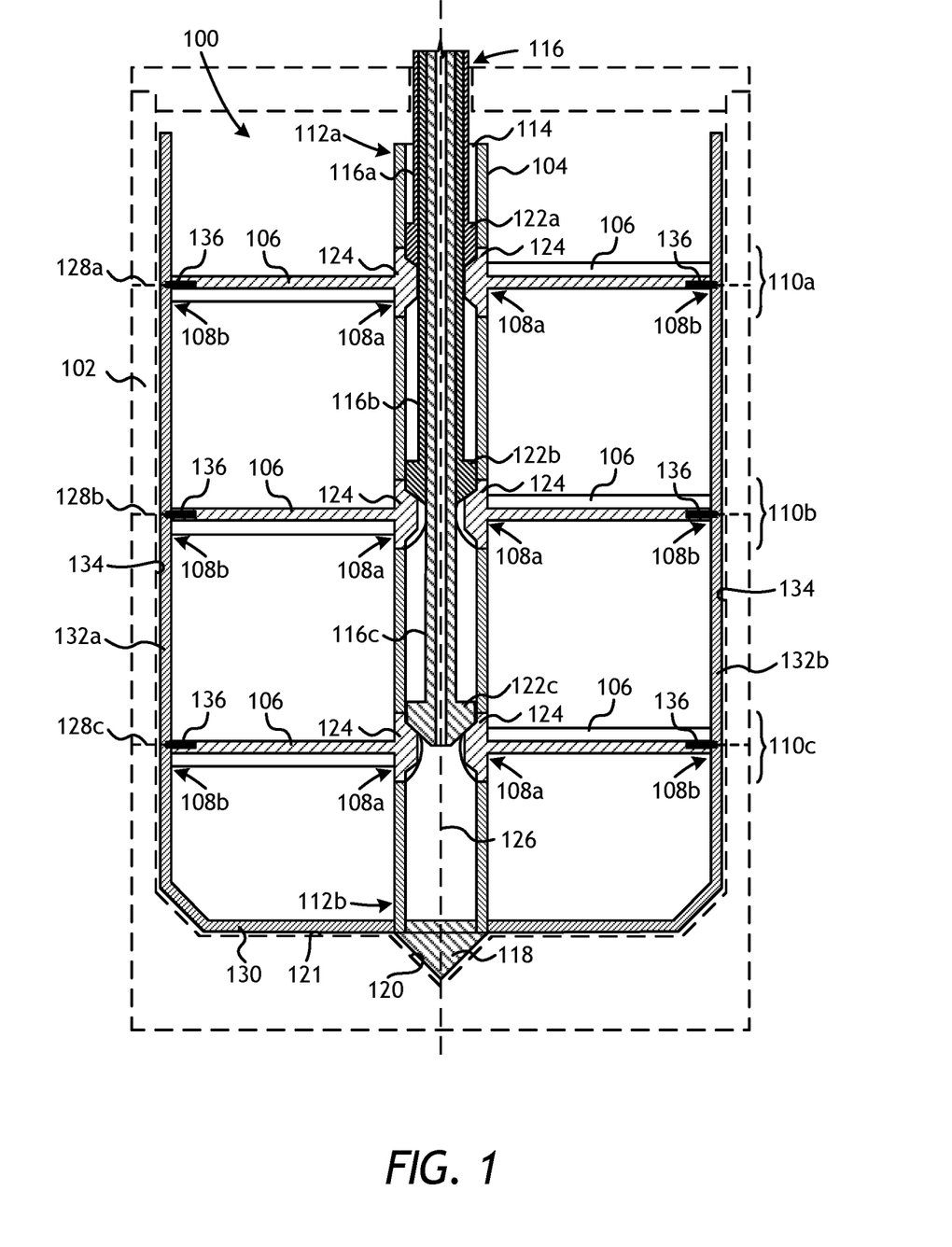
FIG. 1 is a cross-sectional side view of an exemplary paddle.

Referring to FIG. 1, illustrated is a cross-sectional side view of an exemplary paddle 100, according to one or more embodiments of the disclosure. In some embodiments, the paddle 100 may be used in conjunction with a consistometer and related apparatus for preparing and testing fluids. The consistometer may include a canister 102, also referred to as a "slurry cup," and the paddle 100 may be disposed or otherwise positioned within the canister 102 during operation. While positioned within the canister 102, the paddle 100 may be configured to stir or agitate a fluid composition (not shown) present within the canister 102. In some instances, the fluid composition may comprise a cement slurry to be tested for use downhole in a wellbore operation. With the help of the stirring action of the paddle 100, the consistometer may be able to monitor various parameters of the fluid composition including, but not limited to, the rheology, the thickening time, and the transition time of the fluid composition.

As illustrated, the paddle 100 may include a central shaft 104 and one or more lateral blades 106 extending laterally (e.g., horizontally) from the central shaft 104. Each lateral blade 106 may include a geared end 108a positioned adjacent the central shaft 104 and a distal end 108b opposite the geared end 108a. In the illustrated embodiment, the paddle 100 is depicted as including several lateral blades 106 grouped into three sets of lateral blades 106, referred to herein as a first blade set 110a, a second blade set 110b, and a third blade set 110c. In some embodiments, as illustrated, each blade set 110a-c may include two lateral blades 106 that extend laterally from the central shaft 104. In other embodiments, however, only one lateral blade 106 or more than two lateral blades 106 may be included in one or more of the blade sets 110a-c, without departing from the scope of the disclosure.

In the illustrated embodiment, each blade set 110a-c includes two lateral blades 106 extending in opposite directions from each other and being angularly offset from each other by 180° about the circumference of the central shaft 104. In other embodiments, however, the lateral blades 106 in each blade set 110a-c may be angularly offset from each other about the circumference of the central shaft 104 by any angle greater than 0° and less than 180°, without departing from the scope of the disclosure.

The blade sets 110a-c may be spaced from each other along the axial height of the central shaft 104. In some embodiments, as illustrated, the blade sets 110a-c may be equidistantly spaced from each other along the axial height of the central shaft 104. In other embodiments, however, one or more of the blade sets 110a-c may be non-equidistantly spaced along the axial height of the central shaft 104, without departing from the scope of the disclosure. While three blade sets 110a-c are depicted in FIG. 1, it will be appreciated that more or less than three blade sets 110a-c may be employed, including only a single blade set. In yet other embodiments, only a single lateral blade 106 may be used in the paddle 100, without departing from the scope of the disclosure.

The central shaft 104 may be cylindrical and include a first end 112a and a second end 112b. An opening 114 may be provided or otherwise defined at the first end 112a to receive a drive shaft 116 within the central shaft 104. At the second end 112b, the central shaft 104 may provide or otherwise define a pivot 118, which may be received within a pivot seat 120 defined in a bottom 121 of the canister 102 when the paddle 100 is positioned therein.

In some embodiments, as illustrated, the drive shaft 116 may include two or more concentric drive shafts 116, shown in FIG. 1 as a first drive shaft 116a, a second drive shaft 116b, and a third drive shaft 116c. The third drive shaft 116c may be concentrically-arranged within the second drive shaft 116b, and the second drive shaft 116b may be concentrically-arranged within the first drive shaft 116a. Each drive shaft 116a-c may be configured to engage and drive a corresponding one of the blade sets 110a-c and, therefore, in at least one embodiment, the number of drive shafts 116a-c may be equal to the number of blade sets 110a-c. In the illustrated embodiment, the first drive shaft 116a may be configured to engage and drive the first blade set 110a, the second drive shaft 116b may be configured to engage and drive the second blade set 110b, and the third drive shaft 116c may be configured to engage and drive the third blade set 110c.

Each drive shaft 116a-c may include or otherwise define a drive gear 122, shown as a first drive gear 122a, a second drive gear 122b, and a third drive gear 122c, respectively, configured to engage and intermesh with a corresponding blade gear 124 included or otherwise defined at the geared end 108a of each lateral blade 106. In at least one embodiment, the drive gears 122a-c and corresponding blade gears 124 may be complimentary bevel gears configured to intermesh with one another in a geared engagement. As illustrated, the first drive gear 122a may be configured to engage and intermesh with the blade gears 124 of the first blade set 110a, the second drive gear 122b may be configured to engage and intermesh with the blade gears 124 of the second blade set 110b, and the third drive gear 122c may be configured to engage and intermesh with the blade gears 124 of the third blade set 110c.

Each drive shaft 116a-c may be able to rotate about a central axis 126 independent of the other drive shafts 116a-c. As a given drive shaft 116a-c rotates, it may be configured to rotate the lateral blade(s) 106 of its corresponding blade set 110a-c about a blade central axis 128, shown as blade central axes 128a, 128b, and 128c, respectively. Rotating the drive shafts 116a-c may transfer torque to the lateral blades 106 of the corresponding blade sets 110a-c via the geared engagement between the drive gears 122a-c and the blade gears 124. In exemplary operation, the first drive shaft 116a may be configured to rotate the first blade set 110a about the first blade central axis 128a, the second drive shaft 116b may be configured to rotate the second blade set 110b about the second blade central axis 128b, and the third drive shaft 116c may be configured to rotate the third blade set 110c about the third blade central axis 128c.

Rotating a given lateral blade 106 about the blade central axis 128a-c may result in moving the lateral blade 106 between a horizontal position and a vertical position. In the horizontal position, the lateral blade 106 may be arranged substantially horizontal or otherwise parallel with the bottom 121 of the canister 102. In the vertical position, the lateral blade 106 may be arranged substantially vertical with respect to the bottom 121 of the canister 102 and otherwise angularly offset from the horizontal position by 90°. In the horizontal position, a given lateral blade 106 may cause minimum drag on the paddle 100 as the paddle 100 moves through (e.g., stirs) a fluid composition (not shown) present within the canister 102 during operation. In contrast, in the vertical position, the given lateral blade 106 may cause maximum drag on the paddle 100 as the paddle 100 moves through the fluid composition during operation.

In some embodiments, the paddle 100 may further include a base 130 and opposing sidewall blades 132a and 132b extending vertically from the base 130. As illustrated, the base 130 may be positioned adjacent the bottom 121 of the canister 102 and the sidewall blades 132a,b may be positioned adjacent an inner wall 134 of the canister 102 when the paddle 100 is disposed therein. During operation, as the paddle 100 moves through a fluid composition present within the canister 102, the base 130 and the sidewall blades 132a,b may help remove particulate material from the bottom 121 and the inner wall 134 of the canister 102, respectively.

In some embodiments where the paddle 100 includes the sidewall blades 132a,b, the distal end 108b of each lateral blade 106 may be rotatably mounted to the sidewall blades 132a,b. In at least one embodiment, for example, the distal end 108b of each lateral blade 106 may be pinned to the sidewall blades 132a,b with a pin 136 or the like. The pins 136 may secure each lateral blade 106 to the sidewall blades 132a,b while simultaneously allowing each lateral blade 106 to rotate about its corresponding blade central axis 128a-c.

Figure 2A:
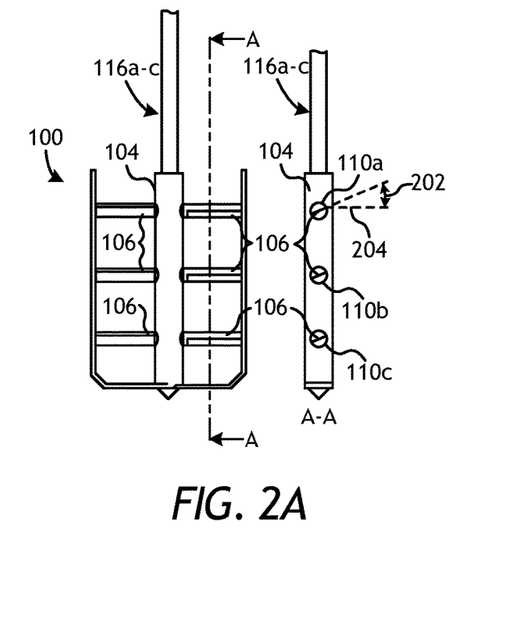
FIGS. 2A and 2B each depict front and partial cross-sectional side views of the paddle of FIG. 1 in different paddle actuations.
Figure 2B:
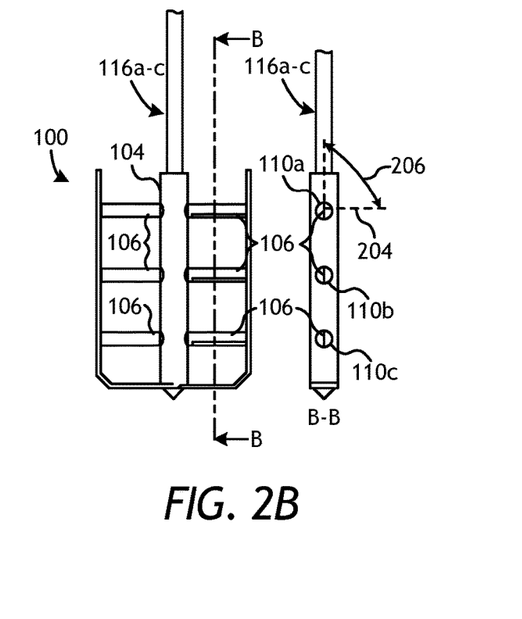

Referring now to FIGS. 2A and 2B, illustrated are front and partial cross-sectional side views of the paddle 100 of FIG. 1, according to one or more embodiments. More particularly, each of FIGS. 2A and 2B show a front view of the paddle 100 (on the left) and a partial cross-sectional side view of the paddle 100 (on the right) as taken along the indicated lines A-A and B-B, respectively.

In FIG. 2A, each of the lateral blades 106 of each blade set 110a-c has been rotated or otherwise moved to an angle 202 between the horizontal and vertical positions. As illustrated, the angle 202 may be about 30° from horizontal 204.

To accomplish this, in at least one embodiment, each of the concentric drive shafts 116a-c may be independently rotated within the central shaft 104 until the lateral blades 106 each assume the angle 202. In other embodiments, as will be discussed below, this may alternatively be accomplished by rotating a single drive shaft within the central shaft 104 until the lateral blades 106 each assume the angle 202.

In FIG. 2B, each of the lateral blades 106 of each blade set 110a-c is shown in the vertical position and otherwise in a position where the lateral blades 106 will cause maximum drag on the paddle 100 as the paddle 100 moves through a fluid composition present within the canister 102 (FIG. 1). To reach the vertical position, each of the lateral blades 106 have been rotated or otherwise moved to an angle 206 that is 90° from horizontal 204. Again, to accomplish this, each of the concentric drive shafts 116a-c may be independently rotated within the central shaft 104 until the lateral blades 106 each assume the angle 206. In other embodiments, this may alternatively be accomplished by rotating a single drive shaft within the central shaft 104 until the lateral blades 106 each assume the angle 206.

Figure 3A:
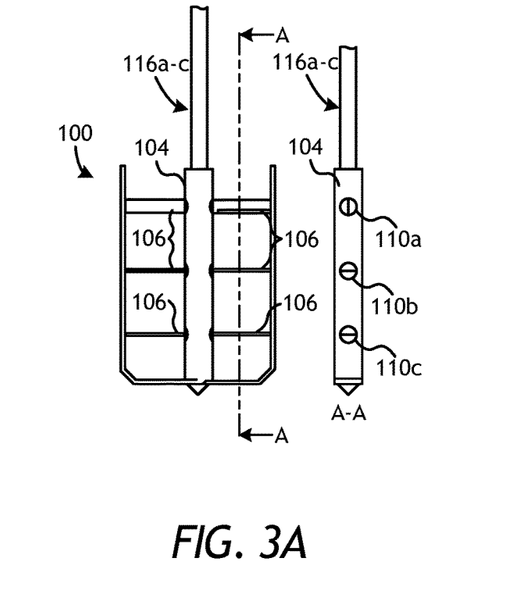
FIGS. 3A-3C each depict front and partial cross-sectional side views of the paddle of FIG. 1 as actuated to various lateral blade configurations.
Figure 3B:
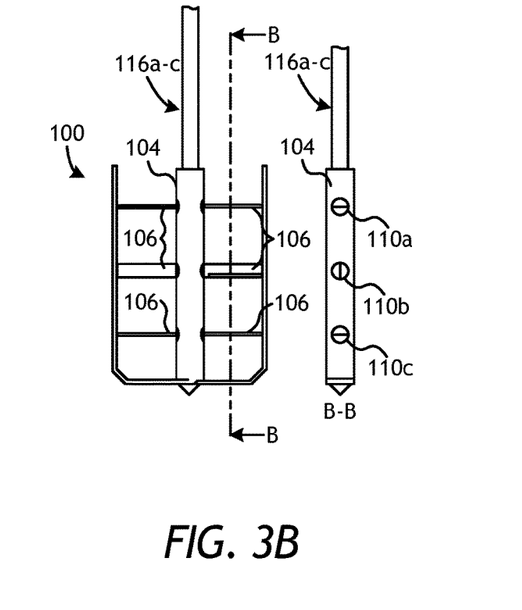
Figure 3C:
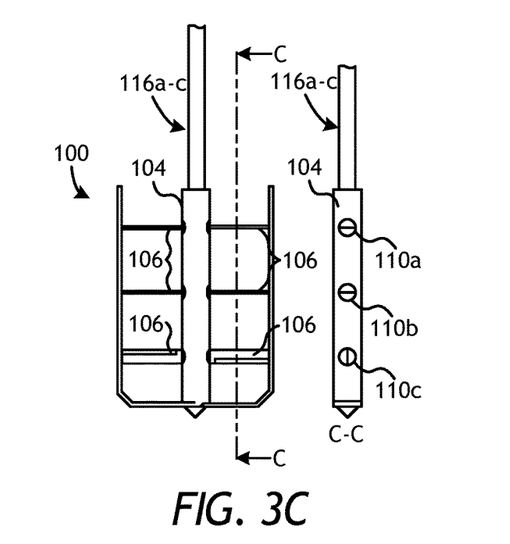

FIGS. 3A-3C each depict front and partial cross-sectional side views of the paddle 100 as actuated to various lateral blade 106 configurations, according to one or more embodiments. Similar to FIGS. 2A-2B, each of FIGS. 3A-3C show a front view of the paddle 100 (on the left) and a partial cross-sectional side view of the paddle 100 (on the right) as taken along the indicated lines A-A, B-B, and C-C, respectively.

In FIG. 3A, the lateral blades 106 of first blade set 110a are depicted in the vertical position, while the lateral blades 106 of second and third blade sets 110b,c are depicted in the horizontal position. In FIG. 3B, the lateral blades 106 of first and third blade sets 110a,c are depicted in the horizontal position, while the lateral blades 106 of second blade set 110b are depicted in the vertical position. In FIG. 3C, the lateral blades 106 of first and second blade sets 110a,b are depicted in the horizontal position, while the lateral blades 106 of third blade set 110c are depicted in the vertical position. To place the blade sets 110a-c in the configurations shown in FIGS. 3A-3C, each of the concentric drive shafts 116a-c may be independently rotated within the central shaft 104 until the lateral blades 106 of each blade set 110a-c assume the desired configuration.

As will be appreciated, the three configurations of FIGS. 3A-3C may prove useful in testing one or more parameters of a fluid composition (not shown), such as settling of the fluid composition. Each blade set 110a-c is arranged within a corresponding "zone" of the paddle 100 and otherwise able to agitate the fluid composition at different axial heights within the canister 102 (FIG. 1). By manipulating the position of the lateral blades 106 in each zone, a user may be able to determine how the fluid composition reacts in gelling or settling over time within the corresponding zones. More particularly, as solid particles settle out of the fluid composition, the torque measured on each blade set 110a-c may change. For instance, as solid particles settle out of a heavy particulate fluid composition, the third blade set 110c may measure a higher torque than the first or second blade sets 110a,b.

Figure 4A:
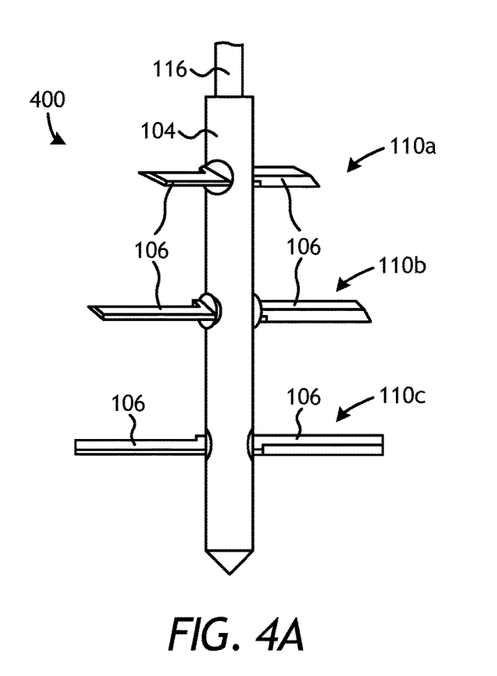
FIGS. 4A and 4B depict side views of another exemplary paddle.
Figure 4B:
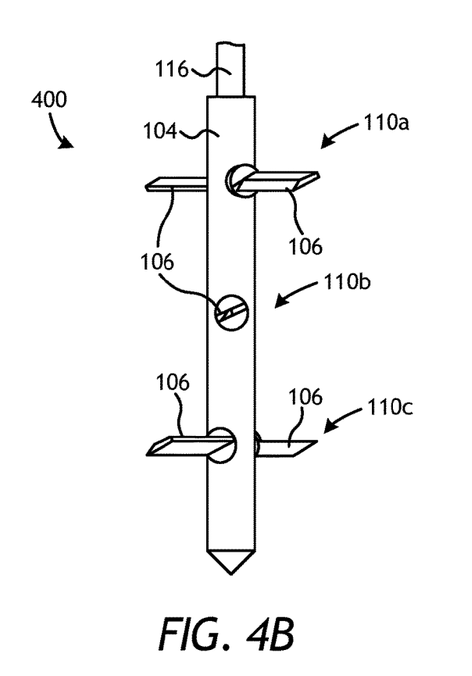

Referring now to FIGS. 4A and 4B, illustrated are side views of another exemplary paddle 400, according to one or more embodiments of the present disclosure. The paddle 400 may be similar in some respects to the paddle 100 of FIG. 1 and therefore may be best understood with reference thereto, where like numerals represent like elements not described again in detail. For instance, similar to the paddle 100 of FIG. 1, the paddle 400 may include the central shaft 104 and the drive shaft 116 movably disposed therein. The paddle 400 may further include one or more of the lateral blades 106 extending laterally (e.g., horizontally) from the central shaft 104, and the lateral blades 106 may be grouped into the three blade sets 110a-c.

Unlike the paddle 100 of FIG. 1, however, the base 130 (FIG. 1) and the sidewall blades 132a,b (FIG. 1) may be omitted from the paddle 400. Moreover, unlike the paddle 100, the blade sets 110a-c of the paddle 400 may not be aligned in a common vertical plane along the axial length of the central shaft 104. Rather, as illustrated, the blade sets 110a-c of the paddle 400 may be angularly offset from each other about the outer circumference of the central shaft 104. In some embodiments, as illustrated, the blade sets 110a-c of the paddle 400 may be angularly offset from each other in a generally helical pattern. In other embodiments, however, the blade sets 110a-c may be angularly offset from each other by any other angle, without departing from the scope of the disclosure.

The geometry of the lateral blades 106 in the embodiments described herein should not be limited to the geometry shown herein. For instance, the geometry and size of each lateral blade 106 may be manipulated and otherwise optimized for particular applications. In some embodiments, for instance, one or more of the lateral blades 106 may have a substantially planar geometry. In other embodiments, however, one or more of the lateral blades 106 may exhibit an airfoil geometry, without departing from the scope of the disclosure. Moreover, in at least one embodiment, the lateral length of one or more of the lateral blades 106 as extending from the central shaft 104 may be different than the lateral length of other lateral blades 106.

Figures 5, 5A:
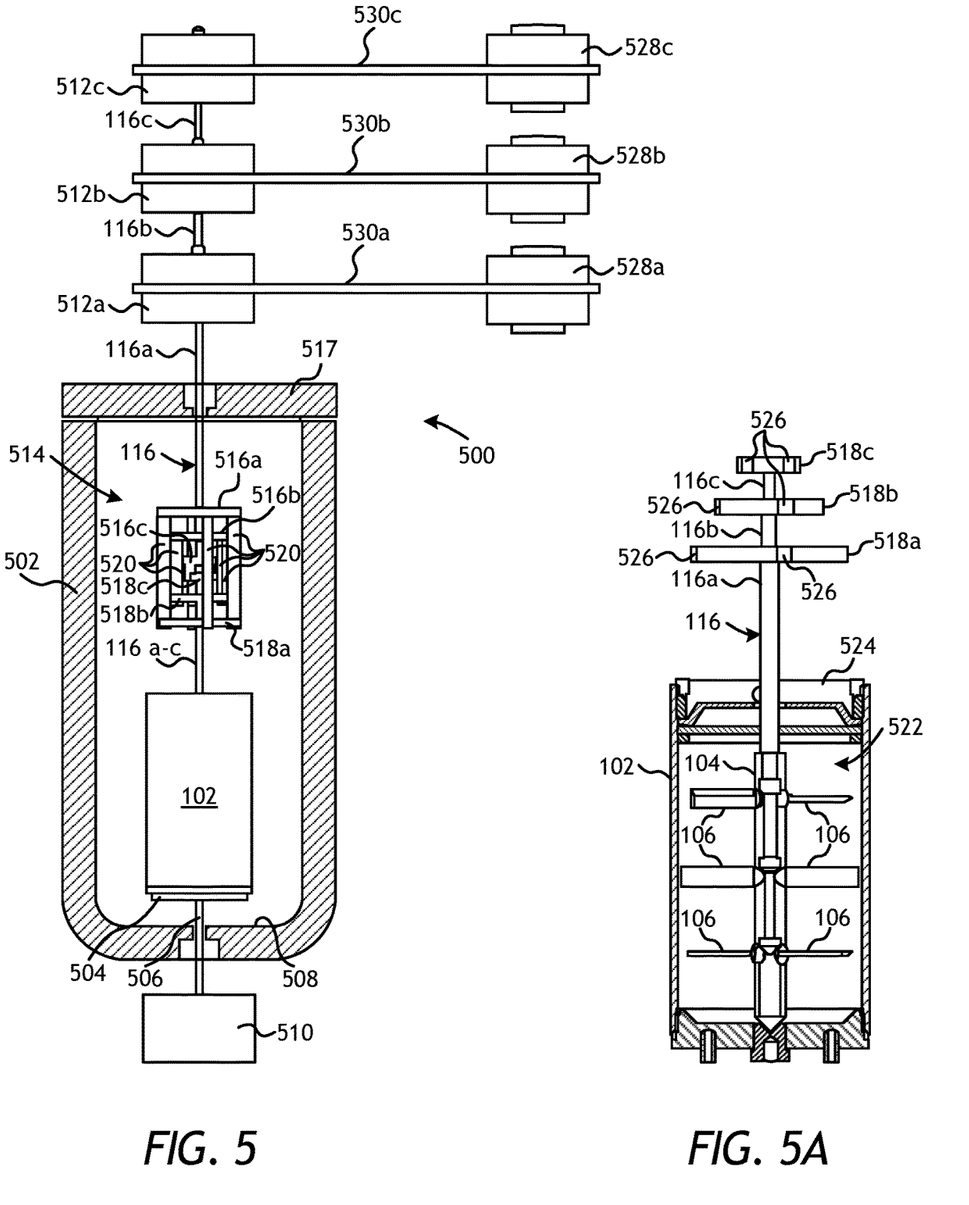
FIG. 5 depicts a partial cross-sectional view of an exemplary consistometer assembly.
FIG. 5A depicts an exemplary paddle positioned within the canister of FIG. 5 and a coupling.

Referring now to FIG. 5, with continued reference to the prior figures, illustrated is a partial cross-sectional view of an exemplary consistometer assembly 500, according to one or more embodiments. As illustrated, the consistometer assembly 500 may include a pressure vessel 502 configured to receive the canister 102. While not shown in FIG. 5, a paddle, such as one of the paddles 100 or 400 described above, may be positioned within the canister 102 for operation.

The consistometer assembly 500 may also include a pedestal 504 positioned within the pressure vessel 502, a pedestal drive shaft 506 extending from the pedestal 504 and through a bottom 508 of the pressure vessel 502, and a pedestal driver 510 operatively coupled to the pedestal drive shaft 506. The canister 102 may be configured to be seated upon the pedestal 504 within the pressure vessel 502. The pedestal driver 510 may be configured to rotate the pedestal drive shaft 506 and, therefore, rotate the pedestal 504 and the canister 102 during operation. Accordingly, in at least some embodiments, the paddle (not shown) within the canister 102 may remain stationary with respect to the pressure vessel 502 during operation.

The consistometer assembly 500 may further include one or more drivers 512 (shown as first, second, and third drivers 512a, 512b, and 512c) operatively coupled to the drive shaft 116 of the paddle (not shown) within the canister 102. In some embodiments, as described in more detail below, there may be a single driver 512 operatively coupled to a single drive shaft 116. In other embodiments, however, there may be two or more drivers 512a-c operatively coupled to a corresponding two or more drive shafts 116a-c. For instance, as illustrated, the first driver 512a may be operatively coupled to the first drive shaft 116a, the second driver 512b may be operatively coupled to the second drive shaft 116b, and the third driver 512c may be operatively coupled to the third drive shaft 116c. As used herein, the term "operatively coupled" refers to a coupling or attachment engagement between two components, where movement or actuation of one component (e.g., the drivers 512a-c) results in the movement of a second component (e.g., the drive shafts 116a-c).

In some embodiments, the drive shafts 116a-c may extend from the corresponding drivers 512a-c to the paddle (not shown) within the canister 102. In other embodiments, as illustrated, the consistometer assembly 500 may include a coupling 514 positionable within the pressure vessel 502 and configured to operatively couple upper portions of the drive shafts 116a-c to lower portions of the drive shafts 116a-c. More particularly, the coupling 514 may include one or more driver plates 516 (shown as first, second, and third driver plates 516a, 516b, and 516c), one or more receiver plates 518 (shown as first, second, and third receiver plates 518a, 518b, and 518c), and a plurality of longitudinally-extending fingers 520 extending between the driver and receiver plates 516a-c, 518a-c. The coupling 514 may be configured to transfer torque applied from the drivers 512a-c through the upper and lower portions of the drive shafts 116a-c to the lateral blades 106 (FIG. 1) of the paddle (not shown) positioned within the canister 102.

As illustrated, the drive shafts 116a-c may extend from the drivers 512a-c through a top 517 of the pressure vessel and to the coupling 514. The first drive shaft 116a may extend to the first driver plate 516a, the second drive shaft 116b may extend to the second driver plate 516b, and the third drive shaft 116c may extend to the third driver plate 516c. The fingers 520 may be configured to operatively couple the driver plates 516a-c to the receiver plates 518a-c such that rotation of one rotates the other. The fingers 520 extending between corresponding driver and receiver plates 516a-c, 518a-c may be fixedly attached to one of the driver and receiver plates 516a-c, 518a-c, and operatively coupled to the other of the driver and receiver plates 516a-c, 518a-c via corresponding grooves 526 (FIG. 5A) defined therein. In the illustrated embodiment, the fingers 520 are each fixedly attached to and extend from the driver plates 516a-c, and are operatively coupled to the receiver plates 518a-c at the corresponding grooves 526 defined in the receiver plate 518a-c. In other embodiments, the fingers 520 may each alternatively be fixedly attached to and extend from the receiver plates 518a-c and may be operatively coupled to the driver plates 516a-c, without departing from the scope of the disclosure.

Referring briefly to FIG. 5A, illustrated is an exemplary paddle 522 positioned within the canister 102. The paddle 522 may be similar in some respects to the paddles 100 or 400 described herein above and therefore may be best understood with reference thereto, where like numerals represent like elements not described again. As illustrated, the canister 102 may have a top 524 through which the drive shafts 116a-c may extend. The receiver plates 518a-c may be provided at the upper end of each drive shaft 116a-c, and each receiver plate may have a plurality of grooves 526 defined therein for the receipt of the fingers 520 (FIG. 5) that extend from the corresponding drive plates 516a-c.

Referring again to FIG. 5, the consistometer assembly 500 may further include one or more torque sensors 528 (shown as first, second, and third torque sensors 528a, 528b, and 528c) operatively coupled to the drivers 512a-c. More particularly, the first torque sensor 528a may be operatively coupled to the first driver 512a via a first belt 530a, the second torque sensor 528b may be operatively coupled to the second driver 512b via a second belt 530b, and the third torque sensor 528c may be operatively coupled to the third driver 512c via a third belt 530c. The torque sensors 528a-c may be configured to measure the torque assumed by the corresponding drivers 512a-c during operation as the paddle 522 (FIG. 5A) within the canister 102 moves through a fluid composition present in the canister 102. The belts 530a-c may be configured to transfer the torque assumed by the corresponding drivers 512a-c to the torque sensors 528a-c to be measured or otherwise quantified. In other embodiments, the belts 530a-c may be replaced by any other coupling engagement between the torque sensors 528a-c and the drivers 512a-c such that the torque sensors 528 a-c are able to monitor the torque sustained by the corresponding drivers 512a-c.

In exemplary operation, a fluid composition, such as a cement slurry, may be placed within the canister 102 to be tested using the consistometer assembly 500. The canister 102 may then be placed upon the pedestal 504 within the pressure vessel 502 with the paddle 522 (FIG. 5A) positioned therein. The drive shaft 116, including each concentrically-arranged drive shaft 116a-c, may extend out of the top 524 (FIG. 5A) of the canister 102, as illustrated. In some embodiments, each drive shaft 116a-c may extend directly to the corresponding drivers 512a-c. In other embodiments, however, the coupling 514 may interpose the upper and lower portions of the drive shafts 116a-c to operatively couple the drive shafts 116a-c to the drivers 512a-c.

With the canister 102 positioned within the pressure vessel 502, and the drivers 512a-c operatively coupled to the drive shafts 116a-c, the top 517 of the pressure vessel 502 may be positioned on the pressure vessel 502 and sealed so that the interior of the pressure vessel 502 may be heated and/or pressurized to simulate various downhole conditions. The canister 102 seated upon the pedestal 504 may be rotated about its central axis by the pedestal driver 510. As the canister rotates 102, the lateral blades 106 (FIG. 5A) move through the fluid composition, thereby stirring or otherwise agitating the fluid composition. Upon reaching predetermined downhole conditions of temperature and/or pressure, one or more parameters of the fluid composition may be determined, such as rheology, thickening time, and transition time of the fluid composition. In some embodiments, for instance, the torque sensors 528a-c may be used to measure the amount of torque assumed by the drivers 512a-c as the paddle 522 (FIG. 5A) moves through the fluid composition at the present conditions. The torque detected by each torque sensor 528a-c may be an indication of the rheology of the fluid composition, which may correspond to the settling of the fluid composition at the given simulated conditions.

Once the parameters of the fluid composition have been measured, one or more of the drivers 512a-c may be actuated to alter the angular configuration of the lateral blades 106. More particularly, each driver 512a-c may be configured to rotate the corresponding drive shafts 116a-c such that the lateral blades 106 are able to move at least 90° about the blade central axes 128a-c (FIG. 1), and thereby move the lateral blades 106 between the horizontal and vertical positions. As indicated above, in the horizontal position, the lateral blades 106 may cause minimum drag on the paddle 522 as passing through the fluid composition and, while in the vertical position, the lateral blades 106 may cause maximum drag on the paddle 522 as passing through the fluid composition. Accordingly, altering the angular configuration of the lateral blades 106 may also alter the amount of torque assumed by the drivers 512a-c and measured by the torque sensors 528a-c as the paddle 522 (FIG. 5A) moves through the fluid composition. The drivers 512a-c may be configured to alter the angular configuration of the lateral blades 106 to any angle between the horizontal and vertical positions.

The consistometer assembly 500 may be calibrated by applying a "dead weight" jig to the drive shaft 116 and measuring the resulting torque on the drive shaft 116. In another case, a calibration fluid of a known viscosity may be placed in the canister 102 and the torque assumed on the drive shaft 116 is measured. Once the consistometer assembly 500 is calibrated at various angular configurations of the lateral blades 106, the consistometer assembly 500 may be switched from a mode of conditioning, homogenizing, or settling the fluid composition, to a rheology measurement mode or gel strength measurement mode without having to remove temperature or pressure from the consistometer system and, therefore, without risking the possibility of contaminating the fluid composition. As a result, a single piece of equipment (i.e., the consistometer assembly 500) can theoretically perform all of the subsequent tests on the fluid composition, thereby allowing for a reduction in the overall footprint required for a lab or testing facility.

In some embodiments, one or more of the pedestal driver 510 and the drivers 512a-c may be magnet drivers. In other embodiments, one or more of the pedestal driver 510 and the drivers 512a-c may be any other actuator or actuation device configured to rotate the pedestal drive shaft 506 (in the case of the pedestal driver 510) and the drive shafts 116a-c (in the case of the drivers 512a-c).

In some embodiments, the lateral blades 106 of any of the paddles described herein may be rotated about the corresponding blade axes 128a-c for stirring or mixing a fluid composition. More particularly, while the drivers 512a-c may be used to adjust the angular configuration of the lateral blades 106 between horizontal and vertical position, as described above, the drivers 512a-c may also be configured to continually rotate the lateral blades 106 about the blade axes 128a-c to mix or help mix a fluid composition. In some embodiments, the paddle may be moving through the fluid composition simultaneously as the lateral blades 106 are rotated continually. In other embodiments, however, the paddle may be stationary within the canister 102 while the lateral blades 106 are rotated continually.

In some embodiments, the lateral blades 106 may be removable and otherwise replaceable after a period of time. For instance, since the lateral blades 106 are required to move through fluid compositions and slurries having a solid particulate content, the outer surfaces of the lateral blades 106 may suffer damage or erosion over time. When damage or erosion is noticed on any of the lateral blades 106, they may be rehabilitated or otherwise replaced with new lateral blades 106.

Figure 6:
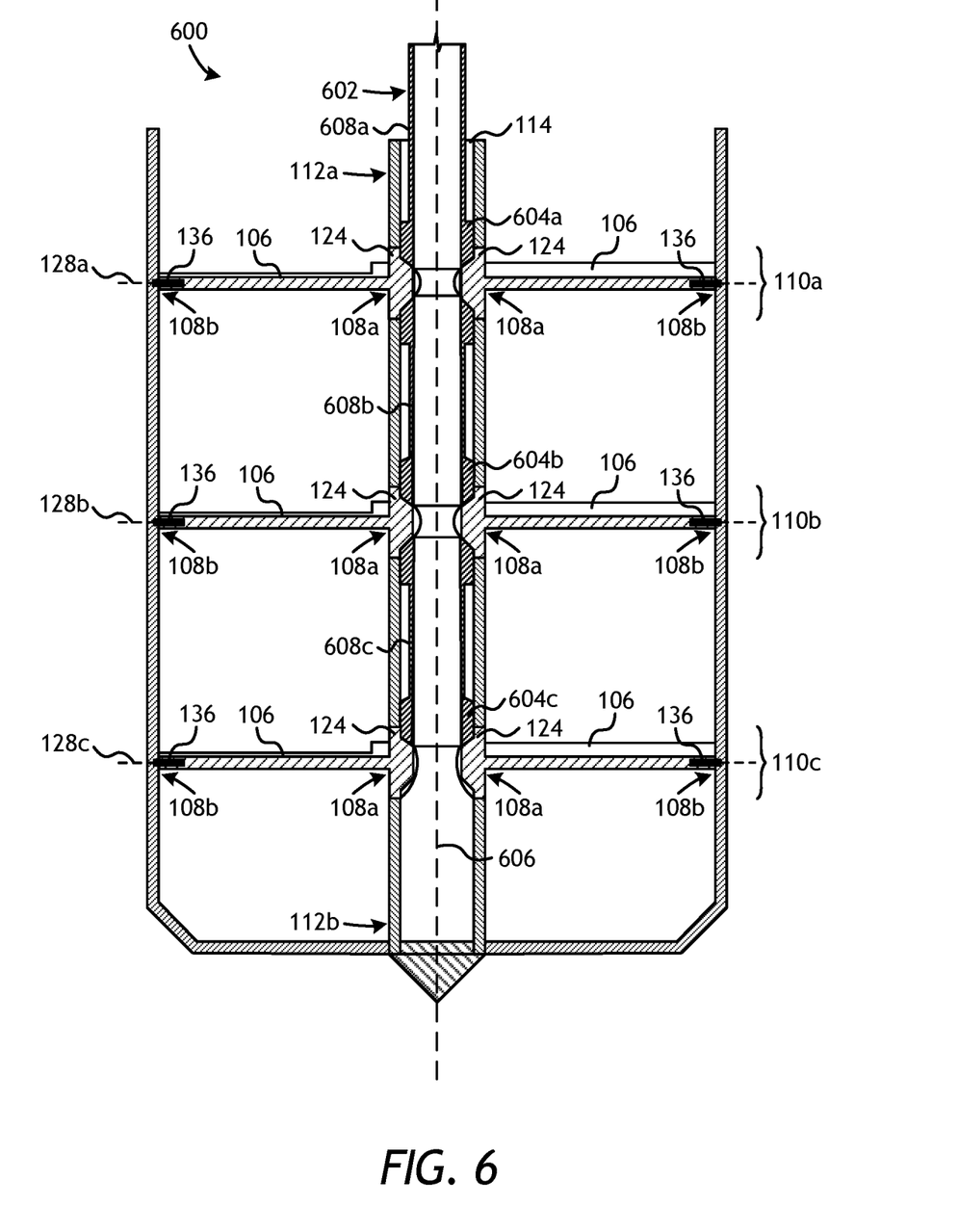
FIG. 6 is a cross-sectional side view of another exemplary paddle.

Referring now to FIG. 6, illustrated is a cross-sectional side view of another exemplary paddle 600, according to one or more embodiments of the disclosure. The paddle 600 may be similar in some respects to the paddle 100 of FIG. 1 and therefore may be best understood with reference thereto, where like numerals represent like elements not described again. Similar to the paddle 100 of FIG. 1, the paddle 600 may be used in conjunction with a consistometer and related apparatus for testing a fluid composition. The paddle 600 may include the central shaft 104 and the one or more lateral blades 106 extending laterally (e.g., horizontally) from the central shaft 104. Similar to the paddle 100, the lateral blades 106 may be grouped into the three blade sets 110a-c. In some embodiments, the paddle 600 may also include the base 130 and opposing sidewall blades 132a,b, and the distal end 108b of each lateral blade 106 may be rotatably mounted to the sidewall blades 132a,b with pins 136. In other embodiments, the base 130 and opposing sidewall blades 132a,b may be omitted, similar to the paddle 400 of FIGS. 4A-4B.

Unlike the paddle 100 of FIG. 1, however, the paddle 600 may include a single drive shaft 602 extendable within the central shaft 104 via the opening 114 at the first end 112a of the central shaft 104. The drive shaft 602 may be configured to simultaneously engage and rotate the lateral blades 106 of each blade set 110a-c about the blade central axis 128. To accomplish this, the drive shaft 602 may include or otherwise define one or more drive gears 604, shown as a first drive gear 604a, a second drive gear 604b, and a third drive gear 604c, respectively, configured to engage and intermesh with a corresponding blade gear 124 included or otherwise defined at the geared end 108a of each lateral blade 106. In at least one embodiment, the drive gears 604a-c and corresponding blade gears 124 may be complimentary bevel gears configured to intermesh with one another in a geared engagement. As illustrated, the first drive gear 604a may be configured to engage and intermesh with the blade gears 124 of the first blade set 110a, the second drive gear 604b may be configured to engage and intermesh with the blade gears 124 of the second blade set 110b, and the third drive gear 604c may be configured to engage and intermesh with the blade gears 124 of the third blade set 110c.

The drive shaft 602 may be able to rotate about a central axis 606 and, as the drive shaft 602 rotates, it may be configured to simultaneously rotate the lateral blade(s) 106 of each blade set 110a-c about the corresponding blade central axes 128a-c. The upper end of the drive shaft 602 may be operatively coupled to a driver (not shown), such as a driver similar to the drivers 512a-c of FIG. 5. The driver may be configured to rotate the drive shaft 602, which, in turn, rotates each of the lateral blades 106 simultaneously via the geared engagement between the drive gears 604a-c and corresponding blade gears 124 of each lateral blade 106.

In some embodiments, the drive shaft 602 may be a solid elongate cylinder providing the drive gears 604a-c at predetermined locations along its axial length to engage the blade gears 124. In other embodiments, however, the drive shaft 602 may be discontinuous or otherwise separated into one or more drive shaft portions 608 configured to engage and rotate corresponding blade sets 110a-c. More particularly, as illustrated, the drive shaft 602 may include a first drive shaft portion 608a configured to engage the blade gears 124 of the first blade set 110a, a second drive shaft portion 608b configured to engage the blade gears 124 of the second blade set 110b, and a third drive shaft portion 608c configured to engage the blade gears 124 of the third blade set 110c. The second drive shaft portion 608b may be driven through geared engagement with the blade gears 124 of the first blade set 110a, and the third drive shaft portion 608c may be driven through geared engagement with the blade gears 124 of the second blade set 110b. Accordingly, rotation of the first drive shaft portion 608a about the central axis 606, as provided by a driver operatively coupled to its upper end, may be transferred to the second and third drive shaft portions 608b,c via the geared engagement with the blade gears 124. As a result, a single driver may be able to move all the lateral blades 106 simultaneously to a predetermined angular configuration between the horizontal and vertical positions.

Embodiments Disclosed Herein Include:

A. A paddle that includes a central shaft having a first end and a second end, one or more lateral blades extending laterally from the central shaft, each lateral blade including a geared end positioned adjacent the central shaft and a distal end opposite the geared end, wherein each lateral blade provides a blade gear at the geared end, and a drive shaft movably positioned within the central shaft and operatively coupled to the one or more lateral blades such that rotation of the drive shaft about a central axis rotates the one or more lateral blades about a corresponding one or more blade axes, the one or more lateral blades being movable between a horizontal position and a vertical position.

B. An assembly that includes a pressure vessel, a canister positioned within the pressure vessel, a paddle positioned within the canister and including a central shaft, one or more lateral blades extending laterally from the central shaft, and a drive shaft movably positioned within the central shaft and operatively coupled to the one or more lateral blades such that rotation of the drive shaft about a central axis rotates the one or more lateral blades about a corresponding one or more blade axes, one or more drivers operatively coupled to the drive shaft to rotate the drive shaft about the central axis and thereby rotate the one or more lateral blades about the corresponding one or more blade axes, wherein the one or more lateral blades are movable between a horizontal position and a vertical position, and one or more torque sensors operatively coupled to the one or more drivers to measure torque assumed by the one or more drivers via the drive shaft.

C. A method that includes rotating a canister within a pressure vessel, the canister having a paddle positioned therein that includes a central shaft, one or more lateral blades extending laterally from the central shaft, and a drive shaft movably positioned within the central shaft and operatively coupled to the one or more lateral blades, moving the one or more lateral blades through a fluid composition present within the canister as the canister rotates, rotating the drive shaft about a central axis with one or more drivers operatively coupled to the drive shaft and thereby rotating the one or more lateral blades about a corresponding one or more blade axes of the one or more lateral blades, and measuring torque assumed by the one or more drivers via the drive shaft with one or more torque sensors operatively coupled to the one or more drivers to measure torque assumed by the one or more drivers.

Each of embodiments A, B, and C may have one or more of the following additional elements in any combination: Element 1: wherein the one or more lateral blades are grouped into one or more blade sets, each blade set including at least one lateral blade and being spaced from any adjacent blade sets along an axial height of the central shaft. Element 2: wherein the one or more blade sets each include two lateral blades extending from the central shaft in opposite directions. Element 3: wherein the one or more blade sets includes at least two blade sets and the drive shaft includes at least two concentric drive shafts independently rotatable about the central axis, each concentric drive shaft being operatively coupled to a corresponding one of the at least two blade sets. Element 4: wherein the one or more blade sets includes at least two blade sets, and wherein the at least two blade sets are angularly offset from each other about an outer circumference of the central shaft. Element 5: wherein the one or more blade sets includes at least two blade sets and the drive shaft is separated into at least two drive shaft portions each engageable with a corresponding one of the at least two blade sets. Element 6: wherein the drive shaft provides one or more drive gears engageable with the one or more lateral blades at the blade gear of each lateral blade. Element 7: wherein the one or more drive gears and the blade gear of each lateral blade comprise complimentary bevel gears. Element 8: further comprising a base positioned at the second end of the central shaft, and opposing sidewall blades extending vertically from the base. Element 9: wherein the distal end of each lateral blade is rotatably mounted to one of the opposing sidewall blades.

Element 10: further comprising a pedestal arranged within the pressure vessel adjacent a bottom of the pressure vessel, the canister being seated on the pedestal within the pressure vessel and the pedestal being driven in rotation with a pedestal driver. Element 11: wherein the one or more lateral blades are grouped into one or more blade sets, each blade set including at least one lateral blade and being spaced from any adjacent blade sets along an axial height of the central shaft. Element 12: wherein the one or more blade sets includes at least two blade sets and the drive shaft includes at least two concentric drive shafts independently rotatable about the central axis, and wherein the one or more drivers includes at least two drivers and each concentric drive shaft is operatively coupled to a corresponding one of the at least two blade sets and a corresponding one of the at least two drivers. Element 13: wherein the one or more torque sensors include at least two torque sensors, and wherein the at least two torque sensors are operatively coupled to the corresponding one of the at least two drivers. Element 14: further comprising a coupling positionable within the pressure vessel to operatively couple upper portions of the drive shaft to lower portions of the drive shaft.

Element 15: wherein rotating the canister within the pressure vessel comprises positioning the canister within the pressure vessel upon a pedestal arranged within the pressure, and rotating the pedestal and the canister with a pedestal driver operatively coupled to the pedestal via a pedestal drive shaft. Element 16: wherein rotating the one or more lateral blades about the corresponding one or more blade axes comprises rotating the one or more lateral blades between a horizontal position and a vertical position. Element 17: further comprising simulating one or more downhole conditions within the pressure vessel, the one or more downhole conditions being at least one of temperature and pressure. Element 18: further comprising measuring one or more parameters of the fluid composition at the one or more downhole conditions, the one or more parameters being at least one of rheology, thickening time, and transition time of the fluid composition. Element 19: further comprising actuating the one or more of the drivers to rotate the drive shaft about the central axis and thereby rotating the one or more lateral blades to a different angular configuration, and measuring the one or more parameters of the fluid composition at the one or more downhole conditions while the one or more lateral blades are in the different angular configuration.

By way of non-limiting example, exemplary combinations applicable to A, B, C include: Element 1 with Element 2; Element 1 with Element 3; Element 1 with Element 4; Element 1 with Element 5; Element 6 with Element 7; Element 8 with Element 9; Element 11 with Element 12; Element 12 with Element 13; Element 17 and Element 18; and Element 18 and Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A paddle, comprising:
a central shaft having a first end and a second end;
one or more lateral blades extending laterally from the central shaft, each lateral blade including a geared end positioned adjacent the central shaft and a distal end opposite the geared end, wherein each lateral blade provides a blade gear at the geared end;
a drive shaft movably positioned within the central shaft and operatively coupled to the one or more lateral blades such that rotation of the drive shaft about a central axis rotates the one or more lateral blades about a corresponding one or more blade axes, the one or more lateral blades being movable between a horizontal position and a vertical position;
a base positioned at the second end of the central shaft; and
opposing sidewall blades extending vertically from the base.

2. The paddle of claim 1, wherein the one or more lateral blades are grouped into one or more blade sets, each blade set including at least one lateral blade and being spaced from any adjacent blade sets along an axial height of the central shaft.

3. The paddle of claim 2, wherein the one or more blade sets each include two lateral blades extending from the central shaft in opposite directions.

4. The paddle of claim 2, wherein the one or more blade sets includes at least two blade sets and the drive shaft includes at least two concentric drive shafts independently rotatable about the central axis, each concentric drive shaft being operatively coupled to a corresponding one of the at least two blade sets.

5. The paddle of claim 2, wherein the one or more blade sets includes at least two blade sets, and wherein the at least two blade sets are angularly offset from each other about an outer circumference of the central shaft.

6. The paddle of claim 2, wherein the one or more blade sets includes at least two blade sets and the drive shaft is separated into at least two drive shaft portions each engageable with a corresponding one of the at least two blade sets.

7. The paddle of claim 1, wherein the drive shaft provides one or more drive gears engageable with the one or more lateral blades at the blade gear of each lateral blade.

8. The paddle of claim 7, wherein the one or more drive gears and the blade gear of each lateral blade comprise complimentary bevel gears.

9. The paddle of claim 1, wherein the distal end of each lateral blade is rotatably mounted to one of the opposing sidewall blades.

10. An assembly, comprising:
a pressure vessel;
a canister positioned within the pressure vessel;
a paddle positioned within the canister and including,
a central shaft,
one or more lateral blades extending laterally from the central shaft,
a drive shaft movably positioned within the central shaft and operatively coupled to the one or more lateral blades such that rotation of the drive shaft about a central axis rotates the one or more lateral blades about a corresponding one or more blade axes,
a base positioned at an end of the central shaft, and
opposing sidewall blades extending vertically from the base;
one or more drivers operatively coupled to the drive shaft to rotate the drive shaft about the central axis and thereby rotate the one or more lateral blades about the corresponding one or more blade axes, wherein the one or more lateral blades are movable between a horizontal position and a vertical position; and
one or more torque sensors operatively coupled to the one or more drivers to measure torque assumed by the one or more drivers via the drive shaft.

11. The assembly of claim 10, further comprising a pedestal arranged within the pressure vessel adjacent a bottom of the pressure vessel, the canister being seated on the pedestal within the pressure vessel and the pedestal being driven in rotation with a pedestal driver.

12. The assembly of claim 10, wherein the one or more lateral blades are grouped into one or more blade sets, each blade set including at least one lateral blade and being spaced from any adjacent blade sets along an axial height of the central shaft.

13. The assembly of claim 12, wherein the one or more blade sets includes at least two blade sets and the drive shaft includes at least two concentric drive shafts independently rotatable about the central axis, and wherein the one or more drivers includes at least two drivers and each concentric drive shaft is operatively coupled to a corresponding one of the at least two blade sets and a corresponding one of the at least two drivers.

14. The assembly of claim 13, wherein the one or more torque sensors include at least two torque sensors, and wherein the at least two torque sensors are operatively coupled to the corresponding one of the at least two drivers.

15. The assembly of claim 10, further comprising a coupling positionable within the pressure vessel to operatively couple upper portions of the drive shaft to lower portions of the drive shaft.

16. A method, comprising:
rotating a canister within a pressure vessel, the canister having a paddle positioned therein that includes a central shaft, one or more lateral blades extending laterally from the central shaft, a drive shaft movably positioned within the central shaft and operatively coupled to the one or more lateral blades, a base positioned at an end of the central shaft, and opposing sidewall blades extending vertically from the base;
stirring a fluid composition present within the canister with the paddle as the canister rotates;
rotating the drive shaft about a central axis with one or more drivers operatively coupled to the drive shaft and thereby rotating the one or more lateral blades about a corresponding one or more blade axes of the one or more lateral blades; and
measuring torque assumed by the one or more drivers via the drive shaft with one or more torque sensors operatively coupled to the one or more drivers to measure torque assumed by the one or more drivers.

17. The method of claim 16, wherein rotating the canister within the pressure vessel comprises:
positioning the canister within the pressure vessel upon a pedestal arranged within the pressure; and
rotating the pedestal and the canister with a pedestal driver operatively coupled to the pedestal via a pedestal drive shaft.

18. The method of claim 16, wherein rotating the one or more lateral blades about the corresponding one or more blade axes comprises rotating the one or more lateral blades between a horizontal position and a vertical position.

19. The method of claim 16, further comprising simulating one or more downhole conditions within the pressure vessel, the one or more downhole conditions being at least one of temperature and pressure.

20. The method of claim 19, further comprising measuring one or more parameters of the fluid composition at the one or more downhole conditions, the one or more parameters being at least one of rheology, thickening time, and transition time of the fluid composition.

21. The method of claim 20, further comprising:
actuating the one or more of the drivers to rotate the drive shaft about the central axis and thereby rotating the one or more lateral blades to a different angular configuration; and
measuring the one or more parameters of the fluid composition at the one or more downhole conditions while the one or more lateral blades are in the different angular configuration.

* * * * *